United States Patent

Guingand et al.

[11] Patent Number: 5,127,881
[45] Date of Patent: Jul. 7, 1992

[54] CONSTANT-VELOCITY JOINT WITH AN AXIALLY RETAINED TRIPOD

[75] Inventors: Daniel Guingand, Triel S/Seine; Francois Verbrugge, Cergy Pontoise, both of France

[73] Assignee: Glaenzer Spicer, Poissy, France

[21] Appl. No.: 599,396

[22] Filed: Oct. 19, 1990

[30] Foreign Application Priority Data

Nov. 13, 1989 [FR] France ............... 89 14847

[51] Int. Cl.⁵ .................................... F16D 3/30
[52] U.S. Cl. ........................... 464/111; 464/905
[58] Field of Search .................. 464/111, 905

[56] References Cited

U.S. PATENT DOCUMENTS 4,339,931 7/1982 Orain ..................................... 464/111
4,421,494 12/1983 Futamura et al. .................. 464/111

FOREIGN PATENT DOCUMENTS 2176216 10/1973 France .
2080490 2/1982 United Kingdom ............... 464/111

Primary Examiner—Daniel P. Stodola
Assistant Examiner—William G. Battista, Jr.

[57] ABSTRACT

A constant-velocity joint with a tripod of the type comprising a tulip and a tripod whose center pivots with radial freedom of movement against the base of the tulip. The tripod is held under axial prestress against this base by an elastic clip having a central part in the form of a cup comprising a base which is in contact with a facing surface of the center of the tripod, and a side wall from the peripheral edge of which extend legs, the free ends of which are joined to the tulip. Each portion of the side wall which extends between two consecutive legs has a hole.

9 Claims, 3 Drawing Sheets

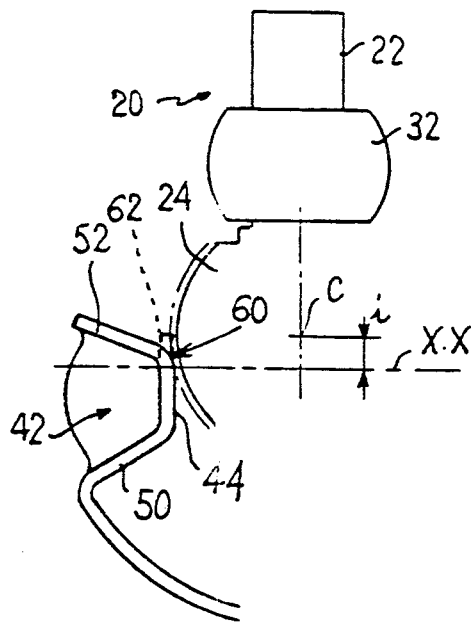
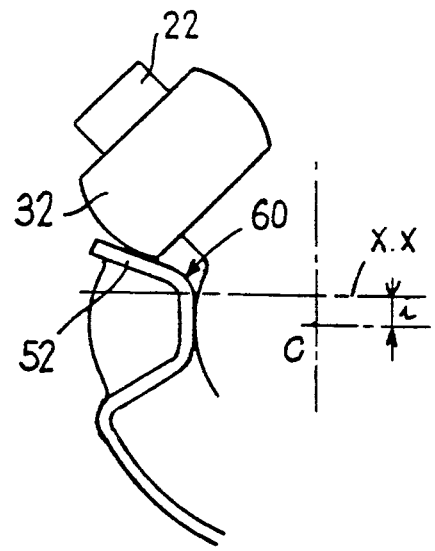
FIG.4A
PRIOR ART
FIG.4B
PRIOR ART
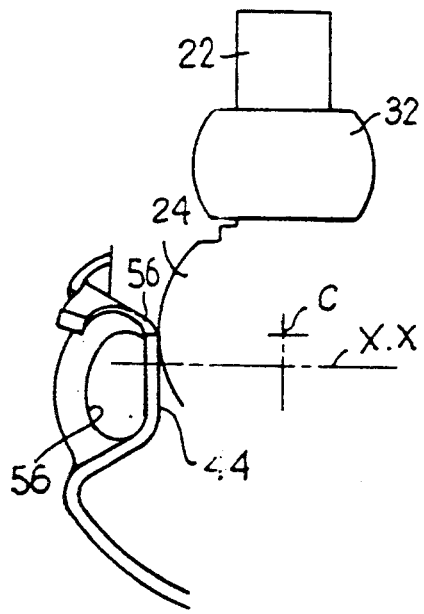
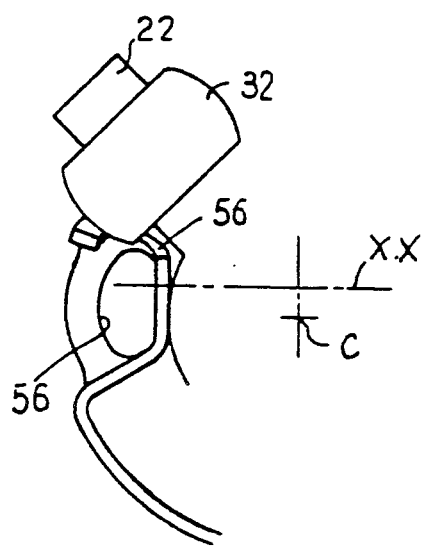
FIG.5A
FIG.5B

CONSTANT-VELOCITY JOINT WITH AN AXIALLY RETAINED TRIPOD

BACKGROUND OF THE INVENTION

(1) Field of the Invention

The present invention relates to a constant-velocity joint with a tripod, of the type comprising a tulip and a tripod whose center pivots with radial freedom of movement against the base of the tulip and is held under axial prestress against this base by an elastic clip having a central part in the form of a cup. The cup comprises a base which is in contact with a facing surface in the center of the tripod, and a side wall from the peripheral edge of which extend legs, the free ends of which are joined to the tulip.

(2) State of the Prior Art

A joint of this type is described, for example, in the document FR-A-2,487,022. In the elastic clip used in this document in order to carry out the function of axially retaining the tripod, the base of the cup is substantially flat and constitutes a bearing table with which a spherical surface of the center of the tripod is in contact.

The elastic clip is a piece formed by the blanking and bending of an elastic metal sheet. Satisfactory bearing of the sphere of the tripod depends on the dimensions of the triangular bearing table with which the spherical center of the tripod is to remain in contact irrespective of the position of the tripod at the maximum angularity of the joint. The height of the equilateral bearing triangle is limited by the fact that, when the joint is at a maximum angle of steering lock, the end position of the roller with which one of the arms of the tripod is equipped fixes a given bending angle for the side wall of the cup relative to the base in the corresponding zone.

Moreover, in the case where the rollers of the tripod interact with substantially toroidal tracks formed in the tulip, the end position of the roller comes even closer to the axis of the joint, which means that the bending angle of the metal sheet must be increased. The bending radius which results from this requirement can become incompatible with the needs of the tripod to travel back and forth on the plane bearing table, there being a risk of the tripod bearing against the bending radius.

SUMMARY OF THE INVENTION

So as to overcome the disadvantages which have just been mentioned, the invention provides a constant-velocity joint of the abovementioned type, characterized in that each portion of the side wall of the cup which extends between two consecutive legs has a hole, which enables the bending radius to be dispensed with in this zone and the dimensions of the bearing table to be increased.

According to other features of the invention:
- each of the side-wall portions is a curved portion whose convexity is turned towards the inside of the cup;
- the curved portion is a portion with a profile of revolution, and is in particular cylindrical, its axis coinciding with the axis of the tulip;
- the portions of the side wall of the cup to which the roots of the legs are joined and which extend between the perforated portions of the side wall are substantially triangular plane portions;
- the clip is made as a single piece in an elastic metal sheet; and
- the clip has a ternary symmetry about the axis of the tulip.

Brief Description of the Drawings

Other features and advantages of the invention will become apparent upon reading the detailed description below, for the understanding of which reference will be made to the attached drawings, in which:
- FIGS. 4A and 4B are diagrams which illustrate the maximum radial positions which the central sphere of the tripod occupies relative to its bearing table for two different functioning positions of the joint according to the prior art;
- FIGS. 5A and 5B are views similar to those in FIGS. 4A and 4B of a constant-velocity joint equipped with a perforated elastic clip perforated according to the teachings of the invention.

Detailed Description of the Preferred Embodiments

Figure 1:
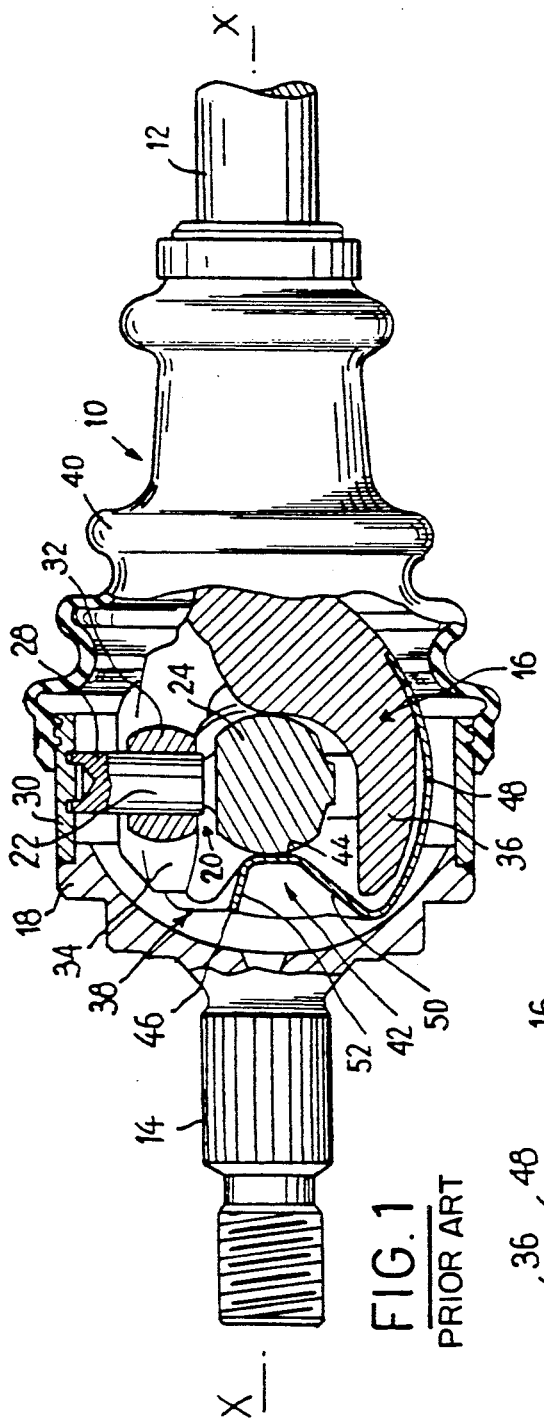
- FIG. 1 is a view in longitudinal cross-section of a constant-velocity joint equipped with an elastic clip according to the prior art.

A constant-velocity joint 1 shown in FIG. 1 which joins a suspended transmission shaft 12 to the stub axle 14 of a front driving wheel of a front-wheel drive vehicle.

The joint comprises a tulip 16 integral with the shaft 12, and a bowl 18 integral with the stub axle 14. A tripod 20 comprises three coplanar radial arms 22 and its center consists of a spherical pivot 24. The free ends 26 of the arms 22 are fixed to the cylindrical side wall 30 of the bowl 18.

Each arm 22 carries, in rotation and in sliding, a roller 32 whose outer surface is spherical and which is accommodated in a rolling path 34 which, in the example shown in FIG. 1, has a circular cross-section and is recessed into the tulip parallel to the axis X—X of the latter. Each rolling path can also have a toroidal profile.

Each rolling path 34 consists of two facing tracks machined on the edges of two of three petals 36 of the tulip 16, these petals having a general orientation parallel to the common axis X—X of the shaft 12 and the tulip 16 and being directed, from the base of the tulip, in the opposite direction to this shaft.

The joint 10 also comprises an elastic clip 38 for axially retaining the tripod 20 and which is fixed to the tulip 16, and a bellows 40 which is fixed, leakproof on one end to the leading periphery of the bowl 18 and on the other end onto the shaft 12.

The elastic clip 38 is made in a single piece from an elastic metal sheet, for example made of spring steel. It has, as does the whole constant-velocity joint, a ternary symmetry about the longitudinal axis X-X of the tulip 16 which is also the axis of the joint when the latter is in the perfectly aligned position as is shown in FIG. 1.

The elastic clip 38 has a central drawn part 42 in the shape of a cup.

The cup 42 comprises a plane base 44 with a substantially trangular shape and a side wall from the peripheral edge 46 of which run three elongated elastic legs 48. The plane surface of the base 44 turned towards the inside of the joint bears elastically against the spherical outer surface of the pivot 24 of the tripod 20.

The side wall of the cup 42 comprises three triangular and substantially plane parts 50, each of which joins the base 44 to the root of one of the legs 48.

Figure 2:
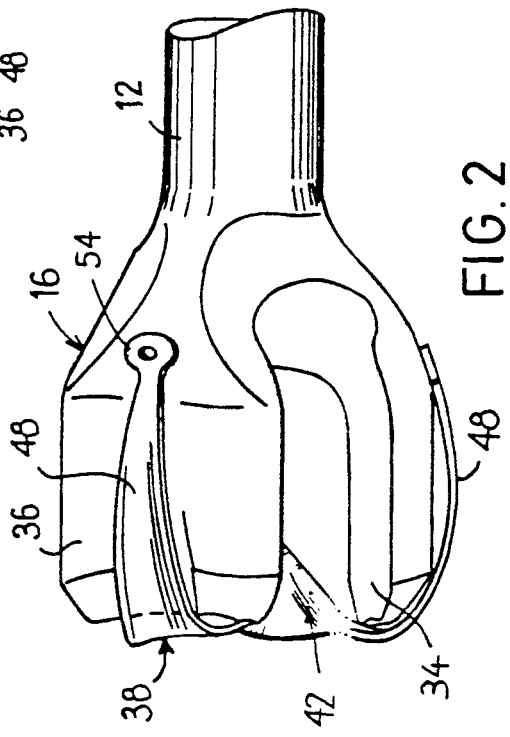
- FIG. 2 is an external view of the tulip of the joint in FIG. 1 illustrating the mounting of the elastic clip.

Between the three portions 50, the side wall of the cup 42 consists of three curved portions 52. Each of the portions 52 is a portion with a substantially cylindrical profile whose convexity is turned towards the inside of the cup and whose axis coincides with the axis X—X of the tulip when the clip 38 occupies the normal mounted position shown in FIGS. 1 and 2.

The free ends 54 of the legs 48 are fixed, by any appropriate means, to the outer peripheral surface of the tulip 16.

Figure 3:
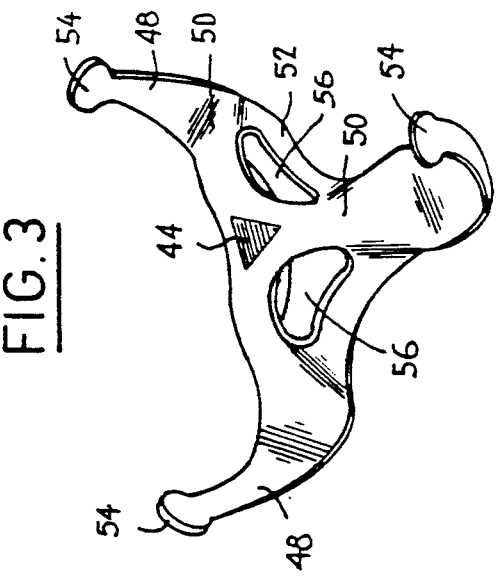
- FIG. 3 is a perspective view of an elastic clip made according to the teachings of the invention.

According to the invention and as is shown in FIG. 3 and in FIGS. 5A and 5B, each portion 52 of the side wall of the cup 42 has a hole 56 which enables the freedom of radial movement of the tripod 20 relative to the tulip 16 to be increased.

As can be seen in FIG. 4A, in the case of a joint in which the elastic clip does not have holes in the portions 52 of the side wall of the cup 42, the central part 24 of the tripod 20, in the form of a spherical pivot, bears against the bending radius 60 which joins the portion 52 to the triangular bearing table 44 with an offset "i" of its center C relative to the axis X—X. When the joint is in a position of maximum steering lock, and in particular in the case where the tracks 34 are toroidal tracks, the spherical outer surface of the roller 32 abuts the portion 52, which limits the bearing and hence the axial retention.

It is, moreover, impossible to reduce the inclination of the surface 52 relative to the axis X—X since this would necessitate the bending radius 60 being further increased, which is, moreover, detrimental as has been shown in FIG. 4A.

On the other hand, by virtue of the holes 56 provided in the side portions 52 and as has been shown in FIGS. 5A and 5B, it is possible to increase the height of the bearing surface of the table 44 relative to the axis X—X and to dispense with the bending radii 60. The increase in height of the table 44 is shown by the dashed line 62 in FIG. 4A.

The holes 56 also enable it to be ensured, for a position of maximum steering lock, that the sphere 24 bears against the table 44 irrespective of the position of the tripod.

In addition, the holes 56 enable the elasticity obtained for the clip 38 to be increased, the latter thus enabling higher manufacturing tolerances to be absorbed.

Figure 6:
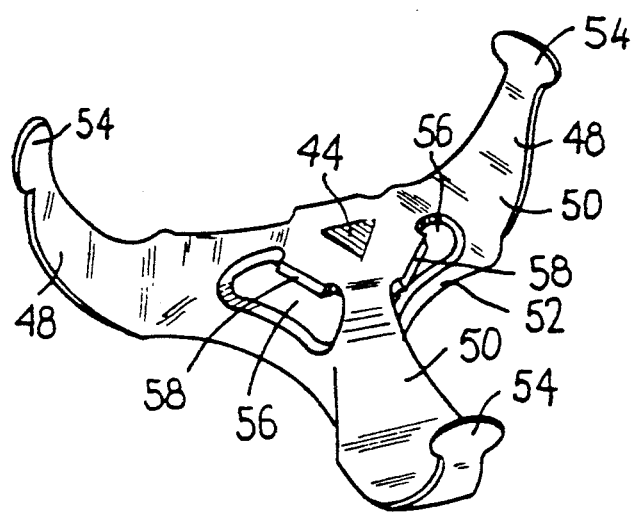
- FIG. 6 is a view similar to that in FIG. 3 of another embodiment of the elastic clip.

Another embodiment of the elastic clip has been shown in FIG. 6. In this figure, the same reference numerals are used to designate elements identical or equivalent to those in FIG. 3.

In order to increase further the radial height of the triangular bearing table 44, the sides of this triangle are extended by bearing tabs 58 which extend in the plane of the table above the curved portions 52 of the side wall.

The tabs 58 are advantageously made during the initial operation of punching the holes 56 and before the clip is bent.

We claim:

1. A constant velocity joint, comprising:
   a tulip element having a base;
   a tripod element having a center pivoting with radial freedom of movement against said base of said tulip element; and
   an elastic clip having a central cup part, said central cup part having a base in contact with said center of said tripod element, and a sidewall, said sidewall having a peripheral edge and a plurality of legs extending from said peripheral edge, portions of said sidewall extending between consecutive said legs, and said legs having free ends joined to said tulip element, wherein each said portion extending between consecutive said legs has a hole therein in order to increase the radial freedom of movement of said tripod element.

2. The joint of claim 1, wherein said base of said central cup part of said elastic clip is substantially planar, said center of said tripod has a substantially spherical surface, and said base of said central cup part is in contact with said substantially spherical surface of said center.

3. The joint of claim 1, wherein each of said sidewall portions is curved with a convex portion directed towards the interior of said central cup part.

4. The joint of claim 3, wherein each of said curved sidewall portions has an axis of curvature extending in the same direction as the axis of said tulip.

5. The joint of claim 3, wherein said curved sidewall portions have a profile of a cylindrical section.

6. The joint of claim 1, wherein said sidewall portions having said holes therein have triangular planar portions therebetween along said sidewall to which the roots of said legs are connected.

7. The joint of claim 1, wherein said base of said cup is substantially planar and triangular, the sides of said triangle being extended by bearing tabs which extend in a plane above said holes.

8. The joint of claim 1, wherein said elastic clip is a single piece made from a metal sheet.

9. The joint of claim 1, wherein said elastic clip has ternary symmetry about its central axis.

* * * * *